US011895103B2

(12) United States Patent
Pati et al.

(10) Patent No.: US 11,895,103 B2
(45) Date of Patent: Feb. 6, 2024

(54) VIRTUAL MEETING SYSTEMS AND METHODS FOR A REMOTE ROOM CONFERENCE SYSTEM

(71) Applicant: Verizon Patent and Licensing Inc., Basking Ridge, NJ (US)

(72) Inventors: Satya Prakash Pati, Bangalore (IN); Peter Verwayen, El Dorado Hills, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 113 days.

(21) Appl. No.: 17/219,487

(22) Filed: Mar. 31, 2021

(65) Prior Publication Data

US 2022/0321548 A1 Oct. 6, 2022

(51) Int. Cl.
*G06F 7/04* (2006.01)
*G06F 15/16* (2006.01)
*H04L 29/06* (2006.01)
*H04L 9/40* (2022.01)
*H04L 12/46* (2006.01)
*H04L 12/18* (2006.01)
*H04W 12/06* (2021.01)

(52) U.S. Cl.
CPC .......... *H04L 63/08* (2013.01); *H04L 12/1818* (2013.01); *H04L 12/4641* (2013.01); *H04L 63/0272* (2013.01); *H04L 63/04* (2013.01); *H04L 63/067* (2013.01); *H04L 63/102* (2013.01); *H04W 12/06* (2013.01)

(58) Field of Classification Search
CPC ..... H04L 63/08; H04L 63/0272; H04L 63/04; H04L 63/067; H04L 63/102; H04L 12/1818; H04L 12/4641; H04W 12/06
USPC .......................................................... 726/4
See application file for complete search history.

(56) References Cited

U.S. PATENT DOCUMENTS

| | | | |
|---|---|---|---|
| 2015/0029302 A1* | 1/2015 | Hendrickson | H04N 7/15 348/14.08 |
| 2015/0349971 A1* | 12/2015 | Sinha | H04W 4/02 370/260 |
| 2016/0247123 A1* | 8/2016 | Holst | G06Q 10/1095 |
| 2017/0324572 A1* | 11/2017 | Biggs | H04L 12/18 |
| 2019/0019162 A1* | 1/2019 | Yang | G06Q 10/1095 |

* cited by examiner

*Primary Examiner* — Jeffrey C Pwu
*Assistant Examiner* — Samuel Ambaye

(57) ABSTRACT

An illustrative user device of a user establishes a secured connection between the user device and a server of an organization. Via the secured connection, the user device receives schedule information of a virtual meeting associated with the user. The user device authenticates a proximity-based connection between the user device and a room conference system. In response to the authenticating of the proximity-based connection, the user device transmits the schedule information of the virtual meeting to the room conference system. The room conference system is configured to use the schedule information to connect to a conference server to launch the virtual meeting on the room conference system. Corresponding methods and systems are also disclosed.

18 Claims, 7 Drawing Sheets

VIRTUAL MEETING SYSTEMS AND METHODS FOR A REMOTE ROOM CONFERENCE SYSTEM

BACKGROUND INFORMATION

A physical meeting space (e.g., a meeting room) may be equipped with a room conference system. The room conference system may allow one or more users in the physical meeting space to participate in a virtual meeting via the room conference system.

Some room conference systems may be implemented at a physical location of an organization (e.g., at an on-site location controlled by an enterprise, a government agency, etc.) and as such may be granted access to resources of the organization (e.g., meeting data of the organization). However, some room conference systems may be implemented outside the physical location of the organization (e.g., at an off-site location not controlled by the organization, such as at a home of an employee of the organization, at a location of a client of the organization, in a rented conference room, etc.) and may not have access to resources of the organization (e.g., the meeting data of the organization).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
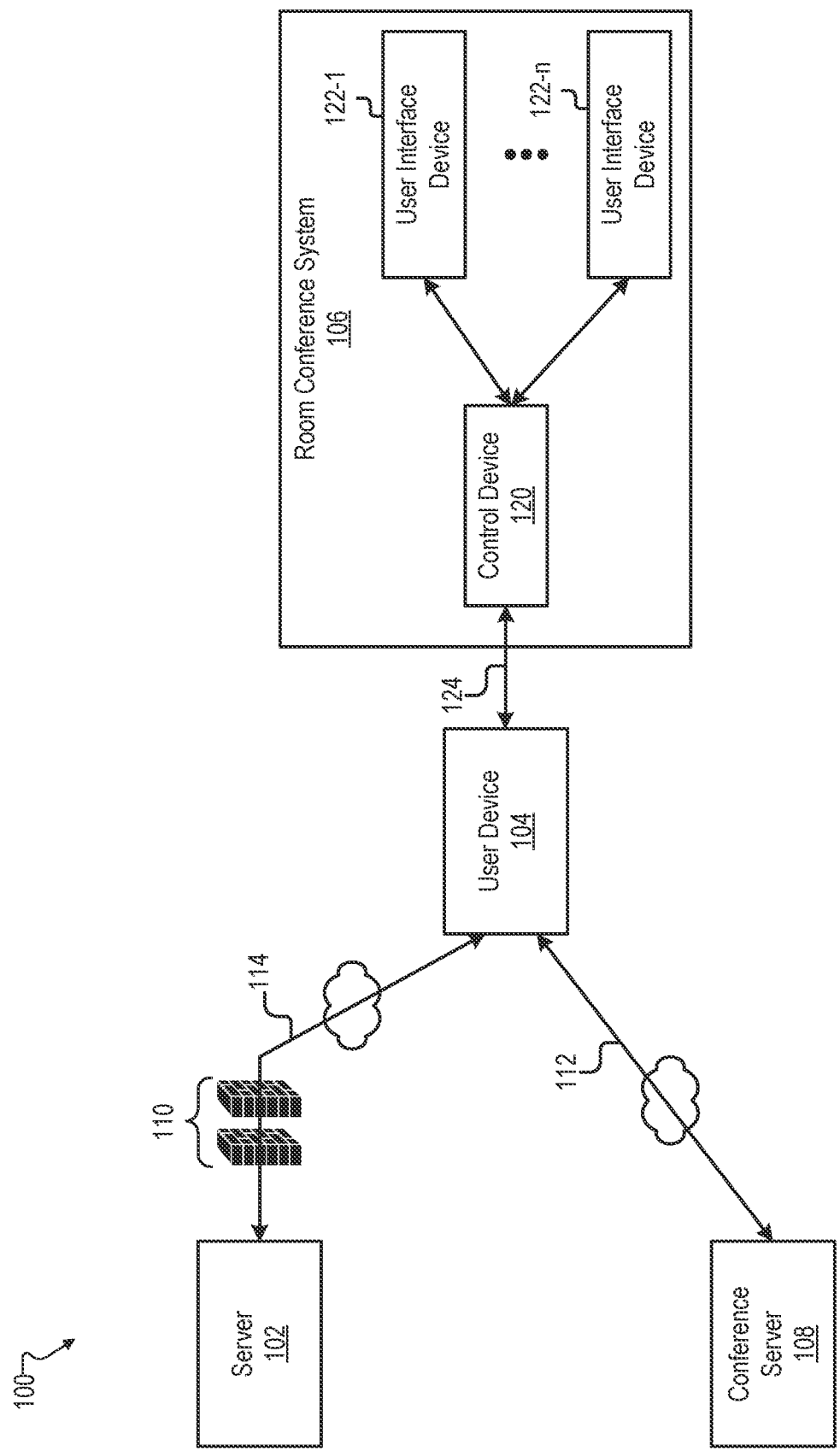
FIG. 1 shows an illustrative virtual meeting system for a remote room conference system according to embodiments described herein.

Virtual meeting systems and methods for a remote room conference system are described herein. In some embodiments, a virtual meeting may be a meeting, such as an online meeting, in which users of electronic devices may electronically participate from various locations. During the virtual meeting, the users may communicate and interact with one another via audio, video, textual messages (e.g., chat), and/or content sharing (e.g., screen share).

In some embodiments, a room conference system may be deployed at a particular physical space (e.g., an office room). The room conference system may include a control device communicatively coupled to one or more user interface devices (e.g., a display screen, a microphone, an audio speaker, etc.). One or more users in the physical space may interact with the control device and the user interface devices of the room conference system to electronically participate in a virtual meeting.

Systems and methods described herein may enable a user to securely and conveniently participate in a virtual meeting associated with an organization via a room conference system, even if the room conference system is not allowed to access resources of the organization. For example, the room conference system may be located remote from a physical facility of an organization (e.g., off-site) and may not be allowed or equipped to access a server of the organization to obtain schedule information of the virtual meeting. Systems and methods described herein may be configured to leverage a user device associated with the user to facilitate the room conference system in accessing resources of the organization, such as the schedule information of the virtual meeting, and using the schedule information to launch the virtual meeting on the room conference system.

In certain embodiments, for example, systems and methods described herein may establish a secured connection between a user device (e.g., a mobile phone) of the user and the server associated with the organization. The user device may receive schedule information of the virtual meeting from the server via the secured connection. In some embodiments, the user device may authenticate a proximity-based connection between the user device and a room conference system. The user device and the room conference system may be located proximate to one another and may both be outside of a private network of the organization that includes the server. In some embodiments, once the proximity-based connection between the user device and the room conference system is authenticated, the user device may transmit the schedule information of the virtual meeting to the room conference system via the proximity-based connection. The room conference system may then use the schedule information to connect to a conference server to launch the virtual meeting on the room conference system. Accordingly, the user may initiate or join the virtual meeting on the room conference system.

Systems and methods described herein may be advantageous in a number of technical respects. For example, as described herein, the systems and methods may establish the secured connection through which the schedule information of the virtual meeting may be transmitted from the server to the user device. The systems and methods may also authenticate the proximity-based connection through which the schedule information of the virtual meeting may be transmitted from the user device to the room conference system. As a result, the schedule information of the virtual meeting may be securely provided to the room conference system without the need to implement expensive hardware devices and/or complicated configuration on the room conference system to enable secured communication between the room conference system and the server. Therefore, users at various physical locations may participate in the virtual meeting using existing room conference systems at their physical locations. This implementation may be efficient and/or effective (e.g., efficient and/or effective use of resources) in enabling multiple users who work remotely from their homes and/or other off-site locations to use room conference systems to participate in virtual meetings.

As described herein, in certain examples, once the schedule information of the virtual meeting is transmitted from the server to the user device and from the user device to the room conference system, the user may initiate or join the virtual meeting from the user device or from the room conference system. For example, the user may simply select a button on the control device of the room conference system to launch the virtual meeting on the room conference system without manually inputting the schedule information of the virtual meeting into the room conference system. As a result, the schedule information may be provided to the room conference system without human error, and the user may conveniently use the room conference system to participate in the virtual meeting without the room conference system being connected directly to the server of the organization.

Various illustrative embodiments will now be described in detail with reference to the figures. It will be understood that the illustrative embodiments described below are provided as examples and that other examples not explicitly described herein may also be captured by the scope of the claims set forth below. Systems and methods described herein may provide any of the benefits mentioned above, as well as various additional and/or alternative benefits that will be described and/or made apparent below.

FIG. 1 shows an illustrative virtual meeting system 100 (system 100) configured to enable a user to participate in a virtual meeting on a room conference system. As depicted in FIG. 1, system 100 may include, without limitation, a server 102, a user device 104, a room conference system 106, and a conference server 108 selectively and communicatively coupled to one another.

Server 102 may be any suitable computing device associated with an organization (e.g., an enterprise, a government agency, etc.) that provides resources and processes requests related to the organization. For example, server 102 may be a schedule server that stores and manages data (e.g., schedule information) of various meetings (e.g., virtual meetings) organized for one or more employees of the organization. In some embodiments, server 102 may be implemented in the form of a hardware server or a virtual server that includes a processor, a memory, and network communication capabilities (e.g., a communication unit). In some embodiments, server 102 may be located on-site at a physical facility of the organization, on a cloud-based system of a cloud services provider, or any combination thereof.

In some embodiments, server 102 may operate within (e.g., be communicatively coupled and have access to) a private network associated with the organization. For example, server 102 and other computing devices associated with the organization may couple to the private network of the organization to communicate with one another via the private network. As depicted in FIG. 1, server 102 may operate behind a firewall system 110 and/or other network security systems to be protected from security attacks. In some embodiments, the private network and computing devices coupled to the private network may be accessible only to authorized users using authorized user devices.

User device 104 may be a computing device of a user associated with the organization. For example, the user may be an employee of the organization and user device 104 may be a mobile phone, a tablet, a laptop, or any computing device of the user. In some embodiments, user device 104 may process various types of data, send and receive data to and from other components of system 100 (e.g., server 102, room conference system 106, conference server 108, etc.), and/or perform various operations described herein to enable the user to participate in a virtual meeting using room conference system 106.

In some embodiments, user device 104 and the user associated with the user device 104 may be authorized to access resources of the organization such as resources of server 102. For example, user device 104 and the user may be subjected to a registration process after which the user may be allowed to access server 102 via user device 104. Accordingly, when the user and/or user device 104 are successfully authenticated by an authentication process performed between server 102 and user device 104, server 102 and user device 104 may communicate with one another various types of data associated with the user. For example, server 102 may transmit to user device 104, via a dedicated Virtual Private Network (VPN) connection using an end-to-end encryption technique, schedule information (e.g., meeting identifier, passcode, meeting participation link, start time, etc.,) of one or more virtual meetings that include the user as a participant. The schedule information may be in any in suitable data format (e.g., a JSON message, a YAML message, an XML message, a defined calendar data file or object format such as an iCalendar data file or object, an ICS file, an IFB file, etc.). To be a participant of a virtual meeting, the user may be an organizer who creates the virtual meeting and initiates the virtual meeting for other attendees to join the virtual meeting. Alternatively, the user may be an attendee who joins the virtual meeting.

In some embodiments, user device 104 may be outside of the private network associated with the organization. For example, the user may be at a physical location (e.g., a home office, a client office, a rented conference room) that is remote from a physical facility of the organization (e.g., off-site), and therefore user device 104 of the user may not be coupled to the private network but to a local network (e.g., a wireless network, a wired network) that is available at the physical location of the user. Accordingly, user device 104 may connect to a public network (e.g., Internet) via a public network connection of this local network. In some embodiments, user device 104 may also be coupled to a cellular data network (e.g., 5G network), and therefore user device 104 may connect to the public network via its cellular data connection. For example, as depicted in FIG. 1, user device 104 may communicate with conference server 108 via a public network through a connection 112. Connection 112 may include the public network connection (e.g., Internet connection) of the local network or the cellular data connection (e.g., 5G connection) of user device 104 as described above.

In some embodiments, user device 104 can securely communicate with server 102 even when user device 104 is outside of the private network. For example, user device 104 may establish a secured VPN connection 114 with server 102. For instance, user device 104 may implement a lightweight Virtual Private Network (VPN) service or application that allows user device 104 to establish the secured VPN connection 114 between user device 104 and server 102. This VPN connection may be considered a secured channel across a public network (e.g., Internet) through which data may be encrypted (e.g., with an end-to-end encryption technology) and securely communicated between user device 104 and server 102 as if user device 104 and server 102 are both coupled to the private network of the organization. For example, user device 104 may securely receive data (e.g., schedule information of virtual meetings associated with the user) from server 102 via VPN connection 114. Server 102 may be configured to transmit and user device 104 may be configured to receive data such as schedule information using any suitable data communication formats and technologies. In certain examples, server 102 may be configured to transmit data such as schedule information to user device 104 if user device 102 is registered with server 102 and the connection over which the data is communicated satisfies predefined requirements (e.g., is a local connection within the private network or is a secure connection such as an encrypted VPN).

Room conference system 106 may be deployed at a physical location that is remote from the physical facility of the organization (e.g., off-site). For example, room conference system 106 may be deployed at a home office of the user, at a conference room of a client, vendor, or other entity associated with the organization, at a rented conference room or office, etc. As depicted in FIG. 1, room conference system 106 may include a control device 120 and one or more user interface devices 122-1 . . . 122-n (commonly referred to herein as user interface device 122). In some embodiments, control device 120 and user interface devices 122 may be equipped and specifically configured for a particular physical space (e.g., an office room). In some embodiments, control device 120 and user interface devices 122 may be integrated into one or more portable units. The one or more portable units may be positioned in any physical space to dynamically enable the user to participate in a virtual meeting in such a physical space without reconfiguring control device 120 and/or user interface devices 122.

In some embodiments, control device 120 may be a computing device communicatively coupled to user interface devices 122 and configured to control and manage operations of user interface devices 122. For example, the user may configure or adjust operation parameters of user interface devices 122 via control device 120. The user may also use control device 120 to manage virtual meetings on room conference system 106. For example, the user may interact with control device 120 to launch or terminate a virtual meeting on room conference system 106, add a virtual meeting to or remove a virtual meeting from a list of scheduled meetings on room conference system 106, etc. In some embodiments, control device 120 may perform various operations of room conference system 106 described herein. For example, the operations of room conference system 106 to receive schedule information of a virtual meeting and launch the virtual meeting on room conference system 106 may be performed by control device 120. In some embodiments, control device 120 may implement a meeting software (e.g., one or more clients) and may be configured to receive one or more types of schedule information (e.g., meeting identifier, meeting participation link, passcode, etc.) as specified by the meeting software. For example, multiple clients may be installed on control device 120, and certain clients may be configured to accept and use particular schedule information, depending on the virtual meeting software being used.

In some embodiments, user interface devices 122 may include one or more input/output devices at the physical location. When the user participates in a virtual meeting at the physical location, user interface devices 122 may receive inputs from the user and/or provide outputs to the user so that the user may interactively communicate in the virtual meeting. Non-limiting examples of user interface devices 122 include a display screen (e.g., a monitor, a touchscreen, etc.), a camera, a microphone, an audio speaker (e.g., a sound bar), a keyboard, a mouse, etc.

In some embodiments, room conference system 106 may be communicatively coupled to user device 104 via a proximity-based connection 124 as depicted in FIG. 1. As described herein, user device 104 and room conference system 106 may both be located at a physical location that is remote from a physical facility of the organization (e.g., off-site). In some embodiments, when user device 104 and room conference system 106 are located proximate to one another at this physical location (e.g., when user device 104 can detect the room conference system 106 and vice versa), user device 104 and room conference system 106 may establish proximity-based connection 124 therebetween. In some embodiments, proximity-based connection 124 may be a short-range connection having a limited communication range that satisfies a communication range threshold. For example, proximity-based connection 124 may be a Bluetooth connection. Other types of proximity-based connection are also possible and contemplated.

In some embodiments, to establish proximity-based connection 124 between user device 104 and room conference system 106, user device 104 may be paired with room conference system 106 in advance. For example, when user device 104 and room conference system 106 are located proximate to one another, the user may use user device 104 or room conference system 106 to initiate a pairing request between these two devices. In response to the pairing request, user device 104 may generate a first pairing code (e.g., a passkey, an n-digit random number, etc.) and transmit the first pairing code to room conference system 106. User device 104 may also display the first pairing code to the user (e.g., on a display screen of user device 104). The user may obtain the first pairing code from user device 104 and input the first pairing code to room conference system 106. Room conference system 106 may then compare the first pairing code received from user device 104 and the user input provided to room conference system 106 by the user. If the first pairing code received from user device 104 matches the user input, room conference system 106 may authorize the pairing relationship between user device 104 and room conference system 106. Room conference system 106 may then update its paired device list to include user device 104.

Similarly, in response to the pairing request, room conference system 106 may generate a second pairing code (e.g., a passkey, an m-digit random number) and transmit the second pairing code to user device 104. Room conference system 106 may also display the second pairing code to the user on room conference system 106 (e.g., on control device 120 or on a display device of room conference system 106). The user may obtain the second pairing code from room conference system 106 and input the second pairing code to user device 104. User device 104 may then compare the second pairing code received from room conference system 106 and the user input provided to user device 104 by the user. If the second pairing code received from room conference system 106 matches the user input, user device 104 may authorize the pairing relationship between user device 104 and room conference system 106. User device 104 may then update its paired device list to include room conference system 106.

In some embodiments, once the pairing relationship between user device 104 and room conference system 106 is established, when user device 104 and room conference system 106 are located within a communication range that allows them to communicate with one another, user device 104 and room conference system 106 may automatically establish proximity-based connection 124 therebetween based on the pairing relationship without requiring any user action or authentication at the moment of establishing the connection. Alternatively, instead of relying on a previously established pairing relationship, user device 104 and room conference system 106 may authenticate one another each time proximity-based connection 124 is formed.

In some embodiments, room conference system 106 may be outside of the private network associated with the organization. For example, as room conference system 106 is provided at the physical location of the user that is remote from the physical facility of the organization (e.g., off-site), room conference system 106 may be coupled not to the private network of the organization but to the local network (e.g., a Wi-Fi home network) available at the physical location of the user. Accordingly, room conference system 106 may connect to the public network (e.g., Internet) via the public network connection of this local network. In some embodiments, user device 104 may operate as a mobile hotspot and may provide a local wireless network. For example, user device 104 may create a short-range hotspot wireless network that connects to the public network via the cellular data connection (e.g., 5G connection) of user device 104. In some embodiments, room conference system 106 may be coupled to the short-range hotspot wireless network and may communicate with conference server 108 via the cellular data connection of user device 104.

In some embodiments, room conference system 106 may be unauthorized and/or unequipped to access resources of the organization such as resources of server 102. For example, room conference system 106 may not be registered to access server 102 and/or may not have resources or permission to establish a VPN connection with server 102, and therefore room conference system 106 cannot access and obtain data directly from server 102.

Conference server 108 may be a computing device associated with a conference service provider and may provide a platform for conducting virtual meetings. In some embodiments, to launch a virtual meeting on user device 104 or on room conference system 106, user device 104 or room conference system 106 may communicate schedule information of the virtual meeting (e.g., meeting identifier (ID), passcode, etc.) and/or other information (e.g., user-selected meeting options, etc.) with conference server 108. User device 104 or room conference system 106 may also communicate with conference server 108 information to perform other operations during the virtual meeting so that participants of the virtual meeting can communicatively interact with one another. As described herein, conference server 108 may communicate with user device 104 or room conference system 106 via the public network (e.g., Internet) through the public network connection of the local network to which user device 104 or room conference system 106 is coupled at an off-site physical location. Additionally or alternatively, conference server 108 may communicate with user device 104 or room conference system 106 via the public network through the cellular data connection (e.g., 5G connection) of user device 104 as described herein.

Figure 2:
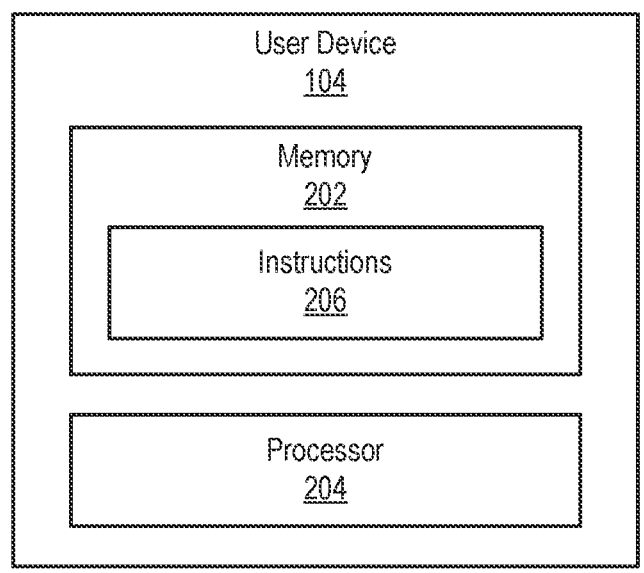
FIG. 2 shows an illustrative user device according to embodiments described herein.

FIG. 2 shows an illustrative user device 104. As depicted, user device 104 may include, without limitation, a memory 202 and a processor 204 selectively and communicatively coupled to one another. Memory 202 and processor 204 may each include or be implemented by computer hardware that is configured to store and/or execute computer software. Various other components of computer hardware and/or software not explicitly shown in FIG. 2 may also be included within user device 104. In some examples, memory 202 and processor 204 may be distributed between multiple components, multiple devices, and/or multiple locations as may serve a particular implementation.

Memory 202 may store and/or otherwise maintain executable data used by processor 204 to perform any of the functionality described herein. For example, memory 202 may store instructions 206 that may be executed by processor 204. Additionally, memory 202 may also maintain any other data accessed, managed, used, and/or transmitted by processor 204 in a particular implementation. Memory 202 may be implemented by one or more memory or storage devices, including any memory or storage devices described herein, that are configured to store data in a transitory or non-transitory manner.

Instructions 206 may be executed by processor 204 to cause user device 104 to perform any of the functionality described herein. For example, instructions 206 may include a virtual meeting management application configured to perform any of the functionality described herein. In some embodiments, the virtual meeting management application may include various operating modes (e.g., a meeting retrieval mode, a meeting synchronization mode, a cellular connection mode, an adaptive setup mode, an enhanced security mode, etc.) that the user may enable, disable, or configure to selectively activate or deactivate various operations described herein. Instructions 206 may be implemented by any suitable application, software, code, and/or other executable data instance(s).

Processor 204 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. Using processor 204 (e.g., when processor 204 is directed to perform operations represented by instructions 206 stored in memory 202), user device 104 may perform various functions associated with enabling the user to participate in a virtual meeting via room conference system 106 in any manner described herein or as may serve a particular implementation.

Figure 3:
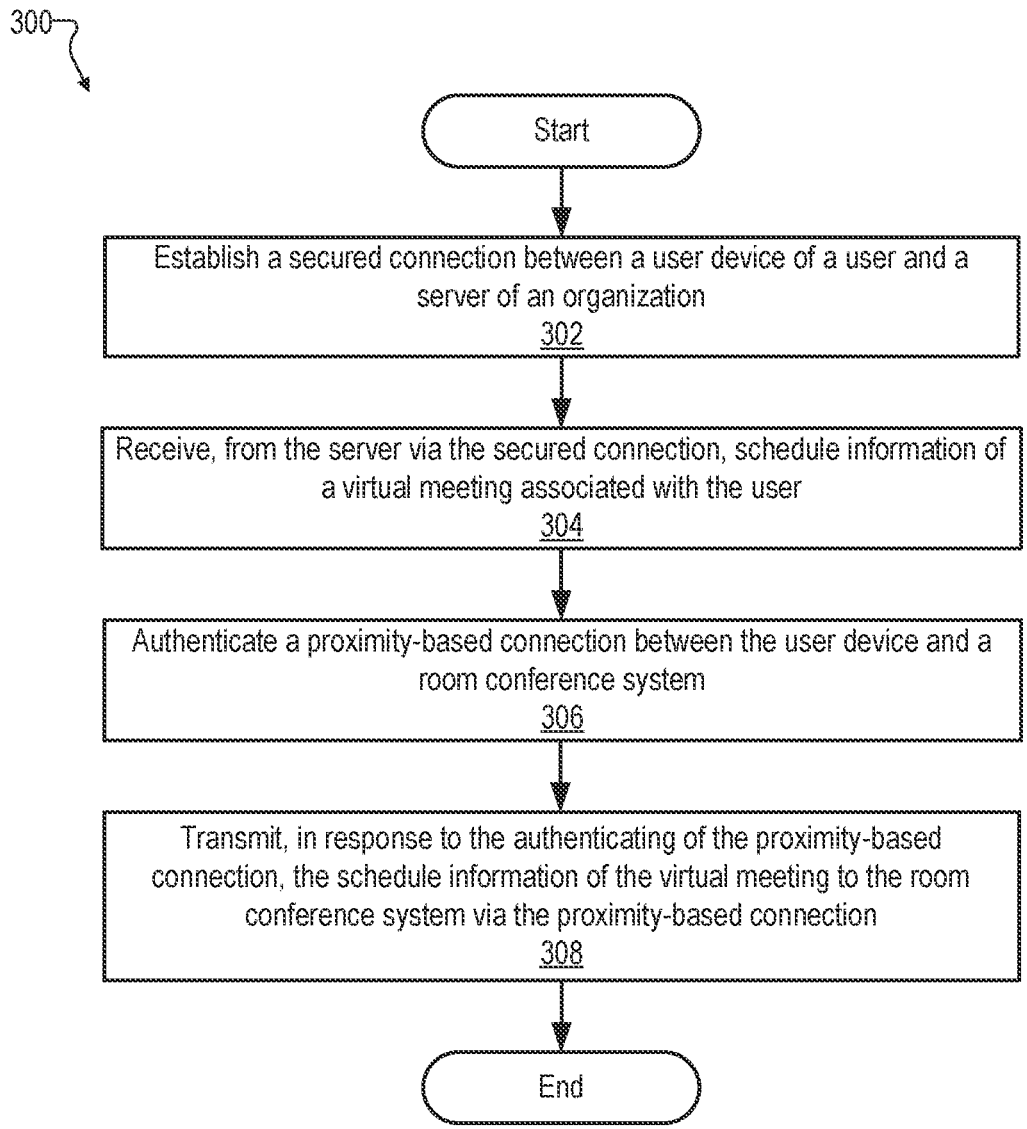
FIG. 3 shows an illustrative virtual meeting method for a remote room conference system according to embodiments described herein.

User device 104 may perform one or more operations that may enable the user to participate in a virtual meeting via room conference system 106 even if room conference system 106 is not allowed or equipped to access server 102 and therefore cannot obtain information of the virtual meeting from server 102. FIG. 3 shows an illustrative virtual meeting method 300 (method 300), which may be performed to facilitate the user participating in a virtual meeting on room conference system 106. While FIG. 3 shows illustrative operations according to one embodiment, other embodiments may omit, add to, reorder, and/or modify any of the operations shown in FIG. 3. In some examples, multiple operations shown in FIG. 3 or described in relation to FIG. 3 may be performed concurrently (e.g., in parallel) with one another, rather than being performed sequentially as illustrated and/or described. One or more of the operations shown in FIG. 3 may be performed by a user device of the user such as user device 104 and/or any implementation thereof.

At operation 302, user device 104 may establish a secured connection between user device 104 and server 102. For example, user device 104 may establish a VPN connection between user device 104 and server 102 using a lightweight VPN service or application implemented on user device 104. As described herein, user device 104 may be at a physical location that is remote from the physical facility of the organization (e.g., an off-site physical location) and may be outside of the private network of the organization. Once the VPN connection between user device 104 and server 102 is established, user device 104 and server 102 may securely communicate with one another via the public network (e.g., Internet) through the VPN connection as if user device 104 and server 102 are both coupled to the private network of the organization as described herein.

At operation 304, user device 104 may receive, from server 102 via the secured connection, schedule information of a virtual meeting associated with the user. For example, server 102 may transmit the schedule information of the virtual meeting to user device 104 via the VPN connection. As described herein, the virtual meeting may be an online meeting scheduled for one or more users associated with the organization and may include the user as a participant (e.g., an organizer or an attendee of the virtual meeting).

In some embodiments, the schedule information of the virtual meeting may include various information usable to launch the virtual meeting on a computing device. Non-limiting examples of the schedule information may include a unique meeting identifier for the virtual meeting, a passcode that is usable to access the virtual meeting, a meeting participation link (e.g., a uniform resource locator (URL) or other logical address for the virtual meeting) that can be selected to access the virtual meeting, one or more dial-in numbers to access the virtual meeting by phone from one or more geographical areas, etc. In some embodiments, the schedule information may also include meeting metadata of the virtual meeting such as a start time of the virtual meeting, an end time of the virtual meeting, a title of the virtual meeting, a time duration of the virtual meeting, a meeting location of an in-person meeting corresponding to the virtual meeting (e.g., one or more remote users may electronically participate in the in-person meeting by joining in the virtual meeting), a participant list of the virtual meeting, etc. Other types of schedule information are also possible and contemplated.

Thus, as user device 104 is allowed to access server 102, user device 104 may obtain the schedule information of the virtual meeting from server 102 via the secured connection. In some embodiments, user device 104 may receive from server 102 schedule information of all virtual meetings associated with the user. Alternatively, user device 104 may receive from server 102 schedule information of one or more virtual meetings associated with the user that have their start time within a predefined time period (e.g., within the next 7 days). Once schedule information of a virtual meeting is received at user device 104, the virtual meeting can be launched on user device 104. For example, user device 104 may use the schedule information to connect to conference server 108 to launch the virtual meeting on user device 104, and therefore the user may participate in the virtual meeting on user device 104.

In some embodiments, the schedule information of the virtual meeting may be provided from user device 104 to room conference system 106 to facilitate room conference system 106 in accessing the virtual meeting such that the user may participate in the virtual meeting via the room conference system 106. To communicate the schedule information of the virtual meeting to room conference system 106, at operation 306, user device 104 may authenticate a proximity-based connection between user device 104 and room conference system 106. As described herein, the proximity-based connection may be a short-range connection such as a Bluetooth connection.

In some embodiments, to authenticate the proximity-based connection between user device 104 and room conference system 106, user device 104 may determine that user device 104 and room conference system 106 are located proximate to one another. For example, user device 104 may determine that room conference system 106 is detected by user device 104. Accordingly, user device 104 may determine that room conference system 106 is located within a sensor range (e.g., a Bluetooth communication range) from user device 104, and therefore determine that user device 104 and room conference system 106 are located proximate to one another. Additionally or alternatively, user device 104 may estimate a distance between user device 104 and room conference system 106. User device 104 may then determine that the distance between user device 104 and room conference system 106 satisfies a distance threshold (e.g., the distance between user device 104 and room conference system 106 may be equal to or lower than a predefined distance), and therefore determine that user device 104 and room conference system 106 are located proximate to one another. Because user device 104 and room conference system 106 are located proximate to one another, it is likely that the schedule information of the virtual meeting may be communicated from user device 104 to room conference system 106 via the proximity-based connection between them without being compromised by a security attack.

In some embodiments, to authenticate the proximity-based connection between user device 104 and room conference system 106, user device 104 may not only determine that user device 104 and room conference system 106 are located proximate to one another but also authenticate the proximity-based connection between user device 104 and room conference system 106 based on authentication data. For example, room conference system 106 may generate the authentication data (e.g., a one-time access code) and display the authentication data on room conference system 106 for the user to obtain and provide a user input to user device 104 based on the authentication data. Room conference system 106 may also transmit the authentication data to user device 104. In some embodiments, user device 104 may compare the authentication data received from room conference system 106 with the user input received from the user. If the authentication data received from room conference system 106 matches the user input received from the user, user device 104 may authenticate the proximity-based connection between user device 104 and room conference system 106. That is, user device 104 may authorize the proximity-based connection between user device 104 and room conference system 106 based on both the proximity between the two devices and the authentication data. In this manner or a similar manner, because the user actively provides the user input based on the authentication data to user device 104, user device 104 may determine that the user is aware and approve of user device 104 communicating with the particular room conference system 106 about the virtual meeting.

In some embodiments, user device 104 may authenticate the proximity-based connection between user device 104 and room conference system 106 based only on the authentication data without verifying in another way that user device 104 and room conference system 106 are located proximate to one another. In some embodiments, to successfully communicate the authentication data between user device 104 and room conference system 106, user device 104 and room conference system 106 may need to be located within a communication range (e.g., a Bluetooth communication range) from one another and therefore may be located proximate to one another. As a result, a separate determination that user device 104 and room conference system 106 are located proximate to one another may be omitted.

At operation 308, in response to the authenticating of the proximity-based connection between user device 104 and room conference system 106, user device 104 may transmit the schedule information of the virtual meeting to room conference system 106 via the proximity-based connection. The schedule information may be transmitted from user device 104 to room conference system 106 in any in suitable data format (e.g., a JSON message, a YAML message, an XML message, a defined calendar data file or object format such as an iCalendar data file or object, an ICS file, an IFB file, etc.) and using any data communication protocols suitable for the proximity-based connection. In some examples, user device 104 may transmit the schedule information to room conference system 106 in the same data format in which the schedule information was received from server 102. In other examples, user device 104 may transmit the schedule information to room conference system 106 in a different data format from the data format in which the schedule information was received from server 102, which may include user device 104 translating and/or encoding the schedule information into another data format. In certain examples, the schedule information transmitted from user device 104 to room conference system 106 may be encrypted (e.g., using the same encrypted message provided by server 102 or another encrypted message generated by user device 104).

The schedule information is configured to be used by room conference system 106 to launch the virtual meeting on room conference system 106. Once the schedule information of the virtual meeting is received at room conference system 106, the virtual meeting can be launched on room conference system 106. For example, room conference system 106 may use the schedule information to connect to conference server 108 to launch the virtual meeting on room conference system 106, and therefore the user may participate in the virtual meeting on room conference system 106. Accordingly, the user may use resources of control device 120 and/or user interface devices 122 in room conference system 106 to interactively communicate in the virtual meeting.

User device 104 may receive schedule information from server 102 via the secured connection and provide the schedule information to room conference system 106 via the proximity-based connection at any suitable times or frequencies and/or in response to any suitable events. In some embodiments, user device 104 may periodically receive updated schedule information of various virtual meetings from server 102 via the secured connection (e.g., the VPN connection) and may periodically transmit the updated schedule information to room conference system 106 via the proximity-based connection (e.g., the Bluetooth connection). For example, the schedule information of the virtual meetings on user device 104 may be synchronized with server 102 at a predefined interval, and the schedule information of the virtual meetings on room conference system 106 may be synchronized with user device 104 at the same predefined interval or at a different predefined interval. As a result, the schedule information of the virtual meetings may be kept up to date on user device 104 and room conference system 106 so that the user may participate in the virtual meetings on user device 104 and/or on room conference system 106 as the user desires.

In certain embodiments, only schedule information of virtual meetings associated with the user is selectively transmitted from server 102 to user device 104 of the user. Such schedule information may then be transmitted from user device 104 of the user to room conference system 106 at the off-site physical location where the user is located. Room conference system 106 may be configured to launch only virtual meetings for which schedule information is received. As a result, room conference system 106 associated specifically with the user may launch only virtual meetings that include the user as a participant on room conference system 106, and may be unable or restricted from obtaining schedule information for and/or launching virtual meetings that are unrelated to the user.

Figure 4A:
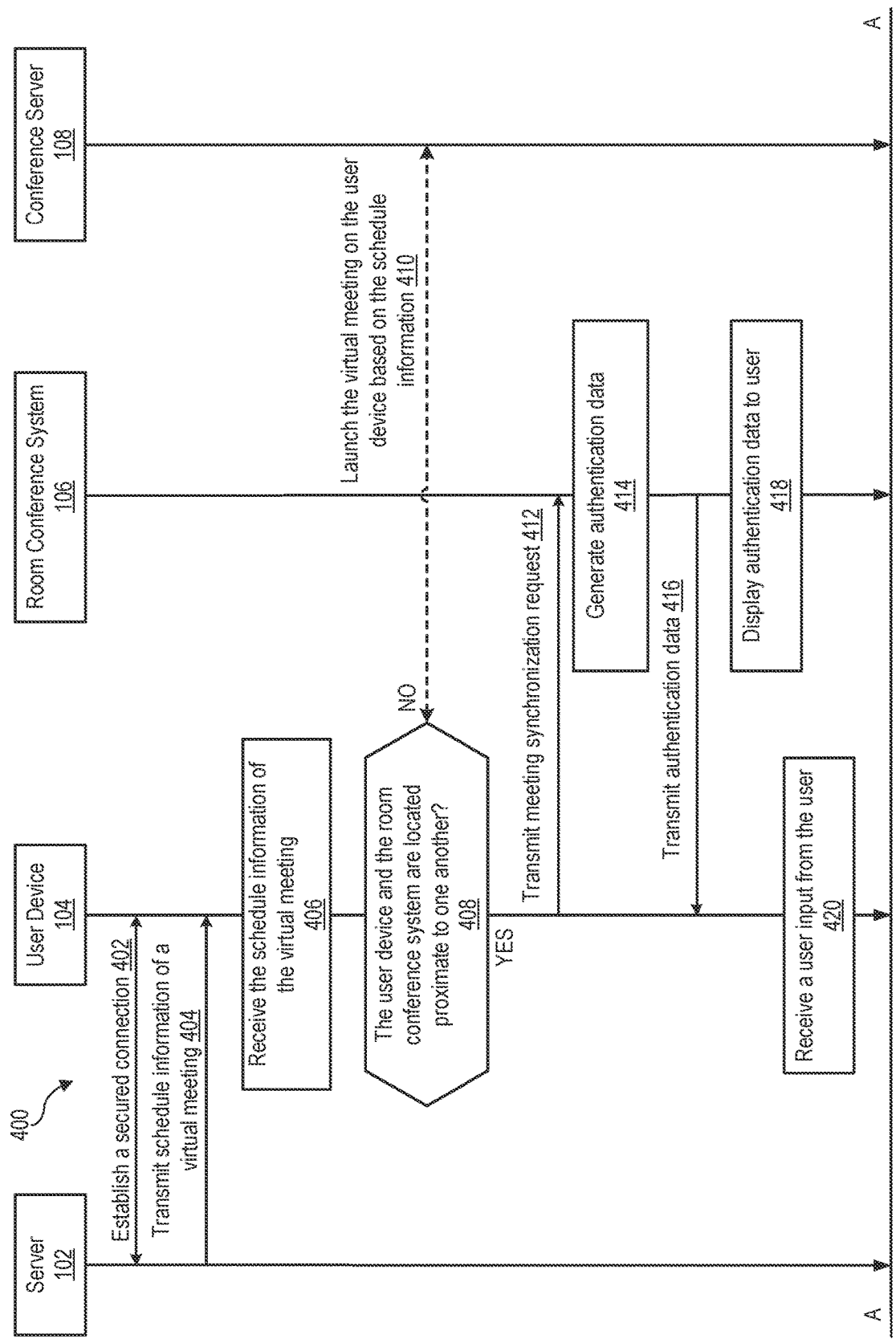
FIGS. 4A and 4B show an illustrative virtual meeting method for a remote room conference system according to embodiments described herein.
Figure 4B:
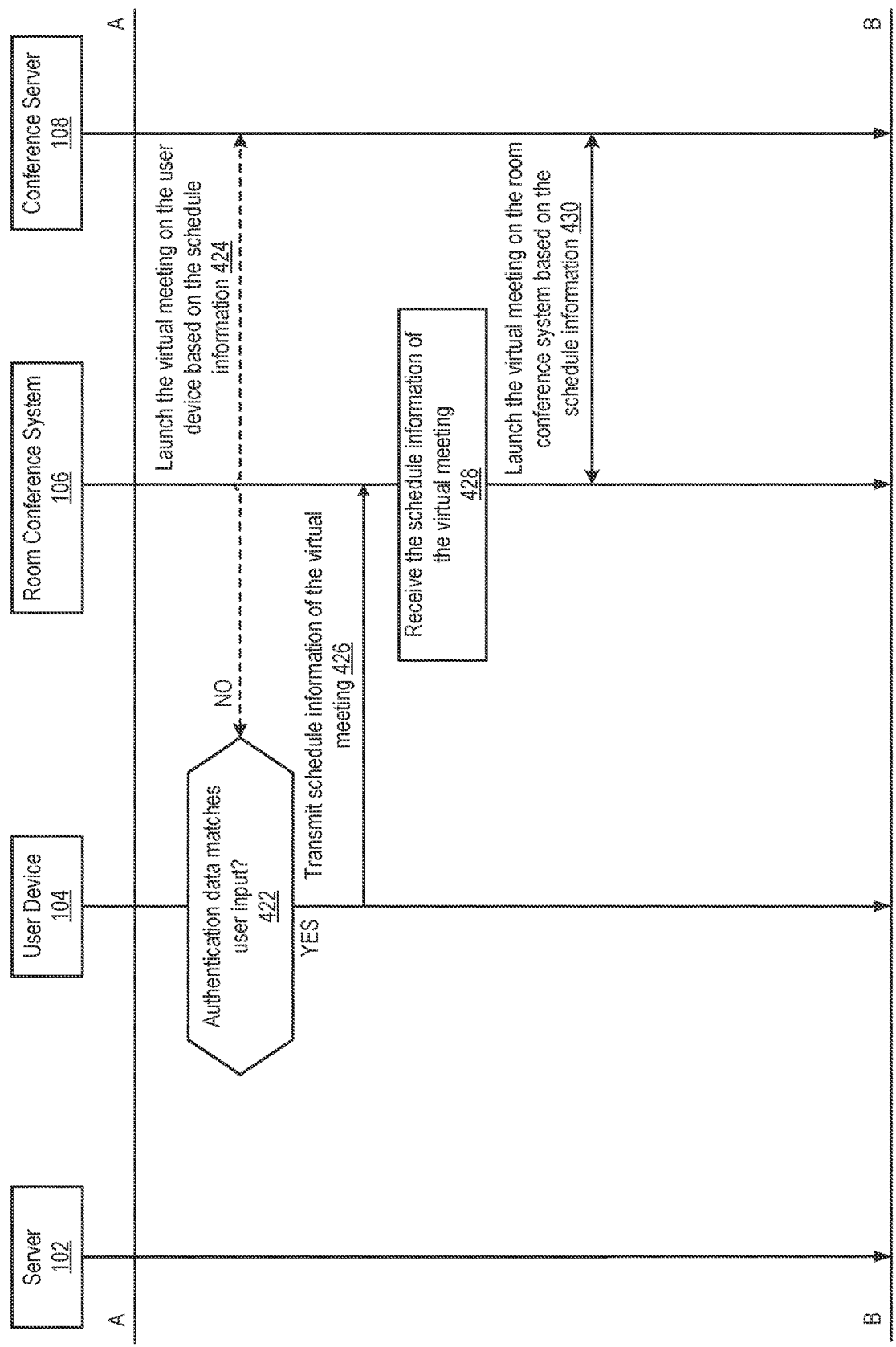

FIGS. 4A and 4B show an illustrative virtual meeting method 400 (method 400), which may be performed to facilitate the user participating in a virtual meeting on room conference system 106. Line AA in FIGS. 4A and 4B may indicate that method 400 continues from FIG. 4A to FIG. 4B, and line BB in FIG. 4B may indicate an end of method 400. While FIGS. 4A and 4B shows illustrative operations according to one embodiment, other embodiments may omit, add to, reorder, and/or modify any of the operations shown in FIGS. 4A and 4B. In some examples, multiple operations shown in FIGS. 4A and 4B or described in relation to FIGS. 4A and 4B may be performed concurrently (e.g., in parallel) with one another, rather than being performed sequentially as illustrated and/or described. As depicted in FIGS. 4A and 4B, operations of method 400 may be collaboratively performed by components of a virtual meeting system such as server 102, user device 104, room conference system 106, and conference server 108 of system 100 and/or any implementation thereof.

In some embodiments, a user may enable a meeting retrieval mode on user device 104 so that user device 104 of the user may securely obtain schedule information from server 102. In response to the meeting retrieval mode being enabled, at operation 402, user device 104 may establish a secured connection between user device 104 and server 102. For example, user device 104 may establish a VPN connection between user device 104 and server 102 using a lightweight VPN service or application implemented on user device 104.

At operation 404, server 102 may transmit schedule information of a virtual meeting associated with the user to user device 104 via the secured connection. As described herein, the schedule information of the virtual meeting may include information usable to launch the virtual meeting on a computing device (e.g., a meeting ID, a passcode, a meeting participation link, one or more dial-in numbers, etc.) and may optionally include meeting metadata of the virtual meeting (e.g., a start time, an end time, a meeting title, a meeting location, a participant list, etc.).

At operation 406, user device 104 may receive the schedule information of the virtual meeting from server 102 via the secured connection. Once the schedule information of the virtual meeting is received at user device 104, the virtual meeting may be launchable on user device 104 based on the schedule information.

In some embodiments, the user may enable a meeting synchronization mode on user device 104 so that user device 104 and room conference system 106 may communicate and exchange schedule information and/or any other information. With the meeting synchronization mode enabled, user device 104 may provide schedule information to room conference system 106. For example, once the schedule information of the virtual meeting user is securely obtained at user device 104 in operation 406, the user may position user device 104 in the vicinity of room conference system 106 and enable the meeting synchronization mode on user device 104 to synchronize the schedule information of the virtual meeting between user device 104 and room conference system 106. In response to the meeting synchronization mode being enabled, user device 104 may authenticate a proximity-based connection (e.g., a short-range connection such as a Bluetooth connection) between user device 104 and room conference system 106 in any of the ways described herein.

In some embodiments, to authenticate the proximity-based connection between user device 104 and room conference system 106, at operation 408, user device 104 may determine whether user device 104 and room conference system 106 are located proximate to one another. For example, user device 104 may determine that room conference system 106 is detected by user device 104 (e.g., room conference system 106 is included in a list of nearby Bluetooth devices detected by user device 104), and therefore determine that user device 104 and room conference system 106 are located proximate to one another. As another example, user device 104 may estimate a distance between user device 104 and room conference system 106, determine that the distance between user device 104 and room conference system 106 satisfies a distance threshold, and therefore determine that user device 104 and room conference system 106 are located proximate to one another.

If user device 104 determines at operation 408 that user device 104 and room conference system 106 are not located proximate to one another, user device 104 may not authorize the proximity-based connection between user device 104 and room conference system 106. In this case, method 400 may proceed with operation 410. At operation 410, user device 104 may launch the virtual meeting on user device 104 based on the schedule information of the virtual meeting. For example, when the user selects the virtual meeting on user device 104, user device 104 may use the schedule information to connect to conference server 108 to launch the virtual meeting on user device 104, and therefore the user may participate in the virtual meeting on user device 104. In some embodiments, operation 410 may be optional as indicated by a dashed line in FIG. 4A.

If user device 104 determines at operation 408 that user device 104 and room conference system 106 are located proximate to one another, user device 104 may authenticate the proximity-based connection between user device 104 and room conference system 106 based on authentication data. In this case, method 400 may proceed with operation 412. At operation 412, user device 104 may transmit a meeting synchronization request to room conference system 106 requesting that the schedule information of the virtual meeting be communicated to room conference system 106.

At operation 414, in response to receiving the meeting synchronization request, room conference system 106 may generate authentication data. As described herein, the authentication data may include a one-time access code and may be generated each time user device 104 requests to transmit schedule information of one or more virtual meetings to room conference system 106. Non-limiting examples of the one-time access code may include a passkey, a passcode, a machine-readable label (e.g., a barcode, a Quick Response (QR) code), etc. Other types of the one-time access code are also possible and contemplated.

At operation 416, room conference system 106 may transmit the authentication data to user device 104. Accordingly, user device 104 may receive the authentication data from room conference system 106 in response to its meeting synchronization request.

At operation 418, room conference system 106 may display the authentication data to the user. For example, room conference system 106 may display the authentication data (e.g., on a display device or control device 120 of room conference system 106) for the user to obtain and provide a user input to user device 104 based on the authentication data.

At operation 420, user device 104 may receive a user input from the user via a user interface of user device 104. The user input may be based on (e.g., may include) the authentication data displayed to the user on room conference system 106. For example, the authentication data may include a passkey or a passcode generated by room conference system 106. The user may reference the passkey or passcode displayed on room conference system 106, and manually input the passkey or passcode to user device 104 using an input component (e.g., a keyboard, a touchscreen, a microphone, etc.) of user device 104. As another example, the authentication data may include a QR code or a barcode generated by room conference system 106, and the user may manually scan the QR code or barcode using an input component (e.g., a camera, an optical reader, etc.) of user device 104.

At operation 422, user device 104 may determine whether the authentication data that user device 104 receives from room conference system 106 matches the user input that user device 104 receives from the user. For example, user device 104 may compare the authentication data received from room conference system 106 with the user input received from the user.

If user device 104 determines at operation 422 that the authentication data received from room conference system 106 does not match the user input received from the user, user device 104 may not authorize the proximity-based connection between user device 104 and room conference system 106. In this case, method 400 may proceed with operation 424. At operation 424, user device 104 may launch the virtual meeting on user device 104 based on the schedule information of the virtual meeting. For example, when the user selects the virtual meeting on user device 104, user device 104 may use the schedule information to connect to conference server 108 to launch the virtual meeting on user device 104, and therefore the user may participate in the virtual meeting on user device 104. In some embodiments, operation 424 may be optional as indicated by a dashed line in FIG. 4B.

If user device 104 determines at operation 422 that the authentication data received from room conference system 106 matches the user input received from the user, user device 104 may approve of user device 104 communicating with room conference system 106 about the virtual meeting. Accordingly, user device 104 may authorize the proximity-based connection between user device 104 and room conference system 106. In this case, method 400 may proceed with operation 426.

At operation 426, user device 104 may transmit the schedule information of the virtual meeting to room conference system 106 via the proximity-based connection. As described herein, the schedule information of the virtual meeting may include information usable to launch the virtual meeting (e.g., a meeting ID, a passcode, a meeting participation link, one or more dial-in numbers, etc.) and may also include meeting metadata of the virtual meeting (e.g., a start time, an end time, a meeting title, a meeting location, a participant list, etc.).

At operation 428, room conference system 106 may receive the schedule information of the virtual meeting from user device 104 via the proximity-based connection. Once the schedule information of the virtual meeting is received at room conference system 106, the virtual meeting may be launchable not only on user device 104 but also on room conference system 106 based on the schedule information.

At operation 430, room conference system 106 may launch the virtual meeting on room conference system 106 based on the schedule information of the virtual meeting. For example, when the user selects the virtual meeting on room conference system 106 or on user device 104, room conference system 106 may use the schedule information to connect to conference server 108 to launch the virtual meeting on room conference system 106, and therefore the user may participate in the virtual meeting on room conference system 106. Accordingly, the user may use resources of control device 120 and/or user interface devices 122 in room conference system 106 to interactively communicate in the virtual meeting.

Figure 5:
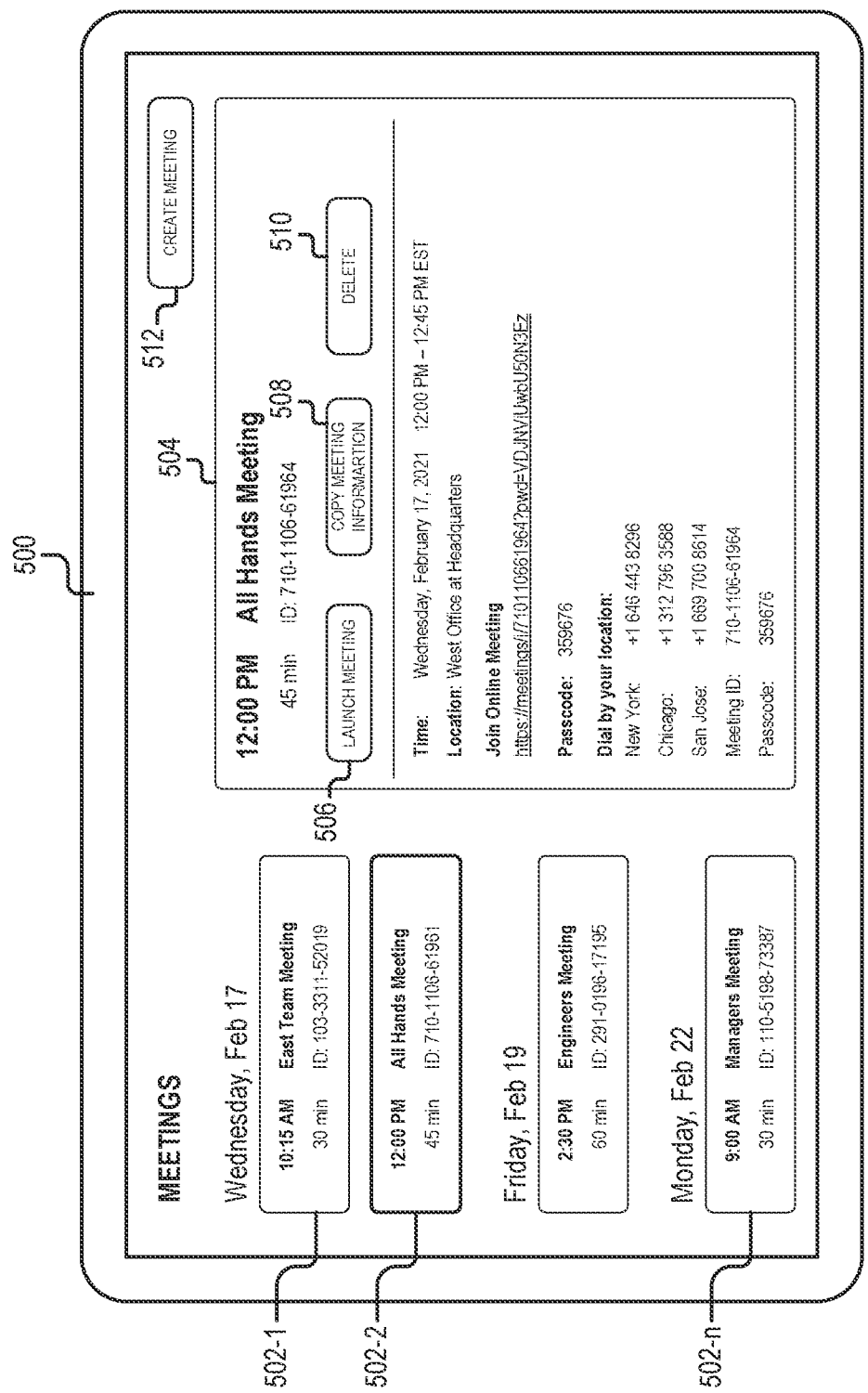
FIG. 5 shows an illustrative user interface on a room conference system according to embodiments described herein.

FIG. 5 shows an illustrative user interface 500, displayed by room conference system 106, through which the user may manage and/or interact with one or more virtual meetings on room conference system 106. In some embodiments, user interface 500 may be displayed to the user on control device 120 or user interface device 122 (e.g., a display device) of room conference system 106.

As depicted in FIG. 5, user interface 500 may include a meeting list including information about one or more virtual meetings 502-1 . . . 502-n (commonly referred to herein as virtual meeting 502). When the user selects (e.g., clicks on or hovers over) a particular virtual meeting 502 (e.g., virtual meeting 502-2) in the meeting list, additional information about the virtual meeting 502 may be shown in a meeting detail section 504 of user interface 500.

In some embodiments, meeting detail section 504 may display schedule information of virtual meeting 502. For example, as depicted in FIG. 5, meeting detail section 504 may display information usable to launch virtual meeting 502, such as the meeting ID of virtual meeting 502 (e.g., 710-1106-61964), the passcode of virtual meeting 502 (e.g., 359676), the dial-in numbers of virtual meeting 502 (e.g., +1 646 443 8296 for New York, +1 312 796 3588 for Chicago, etc.), the meeting participation link of virtual meeting 502 (e.g., https://meetings/j/710110661964?pwd=VDJNVjUwbU50N3Ez), etc.

In some embodiments, in addition to the information usable to launch virtual meeting 502, meeting detail section 504 may also display other information such as meeting metadata of virtual meeting 502. For example, as depicted in FIG. 5, meeting detail section 504 may display the meeting title of virtual meeting 502 (e.g., All Hands Meeting), the start time and the end time of virtual meeting 502 (e.g., Wednesday, Feb. 17, 2021 12:00 PM-12:45 PM EST), the duration of virtual meeting 502 (e.g., 45 min), the meeting location of an in-person meeting corresponding to virtual meeting 502 (e.g., West Office at Headquarters), etc.

In some embodiments, meeting detail section 504 may also include a button 506 that the user may select to conveniently participate in virtual meeting 502 on room conference system 106. For example, the user may simply select button 506 to initiate virtual meeting 502 as an organizer or join virtual meeting 502 as an attendee on room conference system 106 without manually inputting the schedule information (e.g., meeting ID, passcode, etc.) of virtual meeting 502 on room conference system 106. As depicted in FIG. 5, meeting detail section 504 may also include other buttons to perform other operations with regards to virtual meeting 502. For example, meeting detail section 504 may include a button 508 to copy meeting information of virtual meeting 502, a button 510 to delete virtual meeting 502 from the meeting list on room conference system 106, etc. Other buttons and/or graphical elements on user interface 500 to perform other operations related to virtual meeting 502 are also possible and contemplated.

In some embodiments, room conference system 106 may automatically populate the meeting list and meeting detail section 504 on user interface 500 based on scheduled information of one or more virtual meetings that room conference system 106 receives from user device 104 as described herein. Accordingly, room conference system 106 may accurately present schedule information of the virtual meetings for the user so that the user may start participating in a particular virtual meeting simply with one button selection as described above. As depicted in FIG. 5, user interface 500 may also include a button 512 for the user to manually create a new virtual meeting on room conference system 106.

In some embodiments, in response to the user selecting button 506 to participate in a particular virtual meeting, room conference system 106 may use the schedule information of the virtual meeting (e.g., meeting ID, passcode, etc.) to connect to conference server 108 to launch the virtual meeting on room conference system 106. Once the virtual meeting is launched on room conference system 106, room conference system 106 may continue communicating with conference server 108 to perform various operations during the virtual meeting so that the user can interactively participate in the virtual meeting.

As described herein, room conference system 106 may be coupled to a local network (e.g., Wi-Fi network) that is available at the off-site physical location where the user is located and may communicate with conference server 108 via the public network (e.g., Internet) through a public network connection (e.g., Internet connection) of this local network. Additionally or alternatively, instead of using the Internet connection of the local network at the off-site physical location, room conference system 106 may communicate with conference server 108 via the public network through a cellular data connection (e.g., 5G connection) of user device 104 as described herein.

In some embodiments, the user may enable a cellular connection mode on user device 104 so that room conference system 106 may be coupled to the public network via the cellular data connection of user device 104. With the cellular connection mode enabled, user device 104 may operate as a mobile hotspot and create a local wireless network (e.g., a short-range hotspot wireless network), which connects to the public network via the cellular data connection (e.g., 5G connection) of user device 104 as described herein. In some embodiments, room conference system 106 may be communicatively coupled to user device 104 via the local wireless network created by user device 104 and may use the cellular data connection of user device 104 to connect to conference server 108. For example, room conference system 106 may be coupled to the short-range hotspot wireless network and communicate with conference server 108 through the 5G connection of user device 104.

In some embodiments, the cellular data connection of user device 104 may be more secure and/or more reliable than other network connections (e.g., Wi-Fi connection) available to room conference system 106 at the off-site physical location where the user is located. Therefore, communicating with conference server 108 via the cellular data connection of user device 104 may improve the security and/or stability of the virtual meeting deployed on room conference system 106. The cellular data connection of user device 104 may also provide an alternative option for room conference system 106 to connect to conference server 108 when the other network connections at the off-site physical location are subjected to failure and/or become temporarily unavailable or slow.

In some embodiments, user device 104 may determine that room conference system 106 connects to conference server 108 using the cellular data connection of user device 104. For example, user device 104 may monitor its cellular data connection and short-range hotspot wireless network and determine that its cellular data connection is used for the communication between room conference system 106 and conference server 108. In response to such a determination, user device 104 may reduce a cellular network bandwidth allocated to one or more other applications running on user device 104 or disable these applications. As a result, user device 104 may provide additional cellular network bandwidth for room conference system 106, and therefore the quality of the virtual meeting on room conference system 106 may be improved.

In some embodiments, prior to the start time of the virtual meeting, user device 104 may automatically verify an operation status of room conference system 106. For example, user device 104 may request the operation status of room conference system 106 from room conference system 106 and verify whether room conference system 106 is ready to launch the virtual meeting based on the operation status.

In some embodiments, user device 104 may also automatically verify a network condition of the network through which room conference system 106 may connect and communicate with conference server 108. As described herein, such a network may be the local network (e.g., Wi-Fi network) that is available at the off-site physical location or the cellular data network (e.g., 5G network) to which user device 104 is coupled. For example, user device 104 may request performance metrics of the network, and verify based on the performance metrics whether the available bandwidth of the network is sufficient, the network latency of the network satisfies a latency threshold, the port through which room conference system 106 communicate with conference server 108 is open, etc.

Accordingly, user device 104 may confirm whether room conference system 106 and the network are ready to launch the virtual meeting on room conference system 106 before the virtual meeting starts. In some embodiments, this verification process may be performed as a background operation on user device 104 and may not require any action from the user.

In some embodiments, if the operation status of room conference system 106 and/or the network condition of the network indicate that room conference system 106 and/or the network are not ready to launch the virtual meeting on room conference system 106, user device 104 may display a corresponding notification to the user. For example, the notification may inform the user of a status of the network and/or inform the user that low performance of the network may impact the quality of the virtual meeting on room conference system 106. In this case, if room conference system 106 is currently coupled to the local network (e.g., Wi-Fi network) available at the off-site physical location, user device 104 may suggest that the user enable the cellular connection mode so that room conference system 106 may reliably communicate with conference server 108 via the cellular data connection (e.g., 5G connection) of user device 104. Alternatively, user device 104 may automatically enable the cellular connection mode to provide its cellular data connection as another network option that room conference system 106 may use to communicate with conference server 108.

In some embodiments, to facilitate the participation of the user in virtual meetings on room conference system 106, user device 104 may learn user preference in configuring virtual meetings. In some embodiments, the user may enable an adaptive setup mode on user device 104 that allows user device 104 to learn the user preference of the user and adaptively set up the virtual meetings on room conference system 106 based on the user preference. With the adaptive setup mode enabled, user device 104 may start a predefined learning period (e.g., 2 weeks). During the predefined learning period, user device 104 may analyze a plurality of virtual meetings that occur within the predefined learning period, and determine one or more configuration patterns associated with one or more time windows based on the plurality of virtual meetings. For example, user device 104 may learn a first configuration pattern that the user usually turns off video input for virtual meetings that occur after 11 PM. User device 104 may also learn a second configuration pattern that the user usually turns off audio input for virtual meetings that occur at 8 AM on Wednesday. User device 104 may also learn a third configuration pattern that the user usually plays a recorded welcome message for virtual meetings that occur at 5:30 PM on any weekday.

In some embodiments, user device 104 may present one or more meeting options corresponding to the one or more configuration patterns to the user. In the above example, based on the configuration patterns learned from the plurality of virtual meetings, user device 104 may display to the user on user device 104 a first meeting option to automatically turn off video input for virtual meetings that occur after 11 PM, a second meeting option to automatically turn off audio input for virtual meetings that occur at 8 AM on Wednesday, and a third meeting option to automatically play the recorded welcome message for virtual meetings that occurs at 5:30 PM on any weekday.

In some embodiments, user device 104 may receive a user selection of a meeting option among the one or more meeting options presented to the user. For example, the user may select the first meeting option, thereby approving an automated setting to turn off video input for future virtual meetings that occur after 11 PM.

In some embodiments, based on the user selection of the meeting option, user device 104 may automatically apply the meeting option to one or more virtual meetings associated with the time window specified by the meeting option. To apply the meeting option to a particular virtual meeting, user device 104 may determine that the virtual meeting is associated with the time window. For example, user device 104 may determine that the virtual meeting has its start time within the time window specified by the meeting option (e.g., after 11 PM). Based on this determination, user device 104 may automatically transmit the meeting option to room conference system 106, and room conference system 106 may launch the virtual meeting on room conference system 106 based on the meeting option. For example, user device 104 may transmit to room conference system 106 the schedule information of the virtual meeting and the first meeting option to turn off video input. Accordingly, when room conference system 106 launches the virtual meeting based on the schedule information, room conference system 106 may automatically turn off the video input for the virtual meeting as indicated by the first meeting option.

In some embodiments, instead of individually transmitting the meeting option to room conference system 106 for each virtual meeting to which the meeting option is applicable, user device 104 may transmit the meeting option to room conference system 106 in advance, and room conference system 106 may automatically apply the meeting option to virtual meetings when applicable. In this case, when a particular virtual meeting is launched on room conference system 106, room conference system 106 may reference the meeting option received from user device 104, determine that the virtual meeting is associated with the time window specified by the meeting option, and apply the meeting option to the virtual meeting accordingly.

Thus, when the adaptive setup mode is enabled on user device 104, user device 104 may automatically learn how virtual meetings are often set up by the user and inform room conference system 106 to configure future virtual meetings accordingly. As a result, manual configurations of virtual meetings on room conference system 106 by the user may be simplified, and therefore user experience of the user with the virtual meetings on room conference system 106 may be improved.

In some embodiments, room conference system 106 may be deployed in an off-site physical location that is unsecured. In this case, to increase the security for the virtual meeting on room conference system 106, the user may enable an enhanced security mode on user device 104 to require that the virtual meeting be launched and continue on room conference system 106 only when user device 104 and room conference system 106 maintain their proximity to one another. As described herein, user device 104 may transmit the schedule information of the virtual meeting to room conference system 106 via proximity-based connection 124. In some embodiments, once the schedule information of the virtual meeting is received at room conference system 106, room conference system 106 may use the schedule information to launch the virtual meeting on room conference system 106 without further interacting with user device 104. At this point, if the enhanced security mode is disabled, user device 104 and room conference system 106 may no longer need to be located proximate to one another and proximity-based connection 124 therebetween can be terminated.

On the other hand, if the enhanced security mode is enabled, the virtual meeting can only be launched and continue on room conference system 106 if user device 104 and room conference system 106 maintain their proximity to one another. In some embodiments, with the enhanced security mode enabled, user device 104 may determine that the virtual meeting is launched on room conference system 106. For example, user device 104 may request a meeting status from room conference system 106 and determine based on the meeting status that the virtual meeting is launched on room conference system 106 and is currently in progress.

In some embodiments, user device 104 may also determine that user device 104 and room conference system 106 are located insufficiently proximate to one another. For example, user device 104 may determine that room conference system 106 is not detected by user device 104 (e.g., room conference system 106 is not included in a list of nearby Bluetooth devices detected by user device 104). Therefore, user device 104 may determine that user device 104 and room conference system 106 are insufficiently located proximate to one another (e.g., room conference system 106 is located outside a Bluetooth communication range of user device 104) or proximity-based connection 124 between user device 104 and room conference system 106 is terminated (e.g., because Bluetooth communication option of room conference system 106 is disabled). As another example, user device 104 may estimate a distance between user device 104 and room conference system 106, determine that the distance between user device 104 and room conference system 106 does not satisfy a distance threshold, and therefore determine that user device 104 and room conference system 106 are insufficiently located proximate to one another.

In some embodiments, in response to determining that the virtual meeting is currently in progress on room conference system 106 and that user device 104 and room conference system 106 are located insufficiently proximate to one another, user device 104 may terminate the virtual meeting on room conference system 106. For example, user device 104 may transmit a meeting termination request to room conference system 106 requesting the virtual meeting to be terminated on room conference system 106. In response to the meeting termination request, room conference system 106 may display a corresponding notification to the user (e.g., "Virtual meeting is terminated due to insufficient proximity between room conference system and user device.") and terminate the virtual meeting on room conference system 106 accordingly. In some embodiments, room conference system 106 (instead of user device 104) may determine that user device 104 and room conference system 106 are located insufficiently proximate to one another, and therefore automatically terminate the virtual meeting on room conference system 106.

In some embodiments, when the virtual meeting is terminated on room conference system 106 due to insufficient proximity between user device 104 and room conference system 106, the user may re-position the user device 104 and/or room conference system 106 so that the user device 104 and room conference system 106 are located sufficiently proximate to one another (e.g., user device 104 can detect room conference system 106 and/or the distance between user device 104 and room conference system 106 satisfies the distance threshold). The user may then select the virtual meeting on room conference system 106 to resume the virtual meeting on room conference system 106. In response to the user selection, room conference system 106 may connect to conference server 108 using the schedule information of the virtual meeting to re-launch the virtual meeting on room conference system 106, and therefore the user may resume his or her participation in the virtual meeting on room conference system 106.

Thus, when the enhanced security mode is enabled on user device 104, room conference system 106 may launch the virtual meeting and keep the virtual meeting continuing on room conference system 106 only if user device 104 that can access the schedule information of the virtual meeting remains in proximity of room conference system 106. As a result, the security protection provided for participating in the virtual meeting via room conference system 106 may be increased.

While certain examples presented herein are described in relation to schedule information of virtual meetings that room conference system 106 is not allowed to access, the operations described herein may also be applicable to other systems and other types of data and/or resources of the organization that are inaccessible to the systems. For example, for a system located at an off-site physical location that is remote from the physical facility of the organization, the operations described herein may be used to selectively provide the system with data and/or other resources of the organization that are inaccessible to the system so that the system can perform one or more functions at the off-site physical location.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 6:
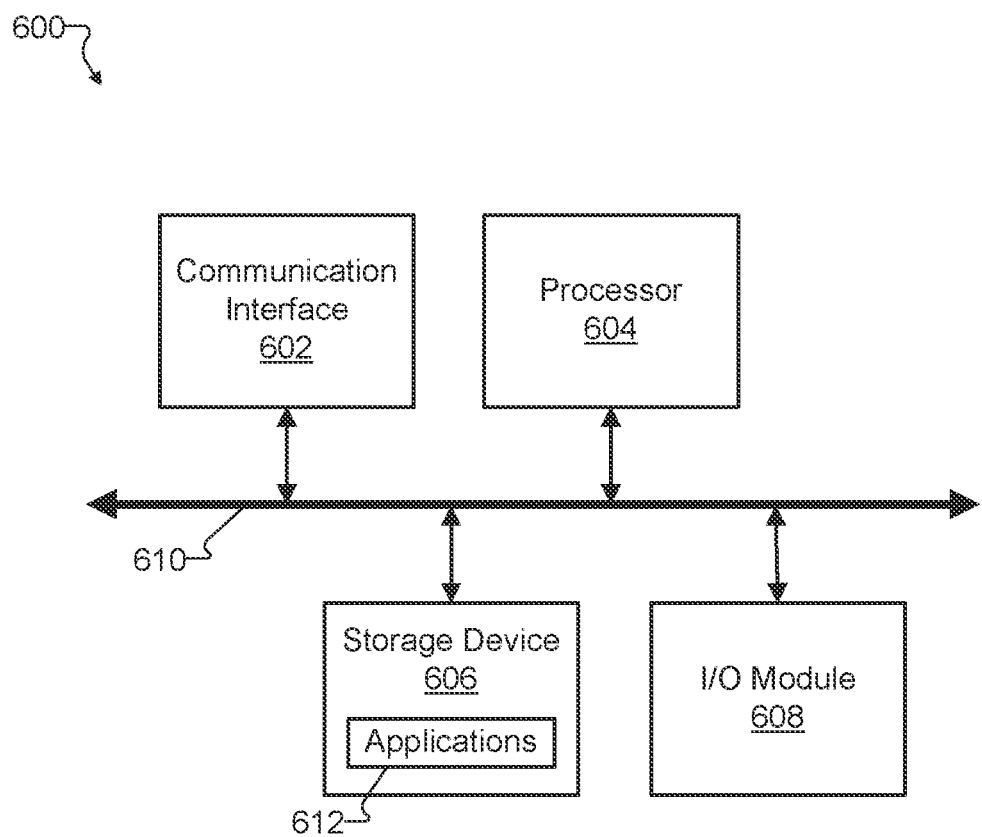
FIG. 6 shows an illustrative computing device according to embodiments described herein.

FIG. 6 shows an illustrative computing device 600 that may be specifically configured to perform one or more of the processes described herein. For example, computing device 600 may include or implement (or partially implement) a virtual meeting system such as system 100, a user device, and/or any other computing devices described herein.

As shown in FIG. 6, computing device 600 may include a communication interface 602, a processor 604, a storage device 606, and an input/output ("I/O") module 608 communicatively connected via a communication infrastructure 610. While an illustrative computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606. In some examples, data may be arranged in one or more databases residing within storage device 606.

I/O module 608 may include one or more I/O modules configured to receive user input and provide user output. One or more I/O modules may be used to receive input for a single virtual experience. I/O module 608 may include any hardware, firmware, software, or combination thereof supportive of input and output capabilities. For example, I/O module 608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 600. For example, one or more applications 612 residing within storage device 606 may be configured to direct processor 604 to perform one or more processes or functions associated with processor 204 of user device 104. Likewise, memory 202 of user device 104 may be implemented by or within storage device 606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
  establishing, by a user device of a user, a secured connection between the user device and a server of an organization;
  receiving, by the user device from the server via the secured connection, schedule information of a virtual meeting associated with the user;
  authenticating, by the user device, a proximity-based connection between the user device and a room conference system; and transmitting, by the user device in response to the authenticating of the proximity-based connection, the schedule information of the virtual meeting to the room conference system via the proximity-based connection, the room conference system being configured to use the schedule information to connect to a conference server to launch the virtual meeting on the room conference system, wherein the authenticating of the proximity-based connection between the user device and the room conference system comprises:

transmitting a meeting synchronization request to the room conference system;

receiving, in response to the meeting synchronization request, authentication data from the room conference system;

receiving, via the user device, a user input from the user;

determining that the authentication data received from the room conference system matches the user input received from the user; and authorizing, based on the determining that the authentication data matches the user input, the proximity-based connection between the user device and the room conference system.

2. The method of claim 1, wherein:
the server is within a private network associated with the organization;
the user device is outside of the private network and is authorized to access the server; and
the room conference system is outside of the private network and is unauthorized to access the server.

3. The method of claim 1, wherein the establishing of the secured connection between the user device and the server comprises:
establishing a Virtual Private Network (VPN) connection between the user device and the server.

4. The method of claim 1, wherein the authenticating of the proximity-based connection between the user device and the room conference system further comprises:
determining that the user device and the room conference system are located proximate to one another.

5. The method of claim 1, wherein:
the room conference system generates the authentication data in response to the meeting synchronization request; and
the authentication data includes a one-time access code.

6. The method of claim 1, wherein:
the virtual meeting is launchable on the user device and on the room conference system in response to the transmitting of the schedule information of the virtual meeting to the room conference system.

7. The method of claim 1, further comprising:
creating, by the user device, a local wireless network;
wherein the room conference system is communicatively coupled to the user device via the local wireless network and configured to use a cellular data connection of the user device to connect to the conference server.

8. The method of claim 7, further comprising:
determining, by the user device, that the room conference system connects to the conference server using the cellular data connection of the user device; and
reducing, by the user device based on the determining that the room conference system connects to the conference server using the cellular data connection of the user device, a cellular network bandwidth allocated to one or more applications on the user device.

9. The method of claim 1, further comprising:
automatically verifying, by the user device prior to a start time of the virtual meeting, an operation status of the room conference system and a network condition of a network through which the room conference system connects to the conference server.

10. The method of claim 1, further comprising:
determining, by the user device, one or more configuration patterns associated with a time window based on a plurality of virtual meetings;
presenting, by the user device to the user, one or more meeting options corresponding to the one or more configuration patterns;
receiving, by the user device from the user, a user selection of a meeting option among the one or more meeting options; and
automatically applying, by the user device based on the user selection, the meeting option to one or more virtual meetings associated with the time window.

11. The method of claim 10, wherein the automatically applying the meeting option to the one or more virtual meetings comprises:
determining that the virtual meeting is associated with the time window; and
transmitting, based on the determining that the virtual meeting is associated with the time window, the meeting option to the room conference system, the room conference system being configured to launch the virtual meeting on the room conference system based on the meeting option.

12. The method of claim 1, further comprising:
determining, by the user device, that the virtual meeting is launched on the room conference system;
determining, by the user device, that the user device and the room conference system are located insufficiently proximate to one another; and
automatically terminating, by the user device based on the determining that the user device and the room conference system are located insufficiently proximate to one another, the virtual meeting on the room conference system.

13. A system comprising:
a memory storing instructions; and
a processor communicatively coupled to the memory and configured to execute the instructions to:
establish a secured connection between a user device of a user and a server of an organization;
receive, from the server via the secured connection, schedule information of a virtual meeting associated with the user;
authenticate a proximity-based connection between the user device and a room conference system; and
transmit, in response to the authenticating of the proximity-based connection, the schedule information of the virtual meeting to the room conference system via the proximity-based connection, the room conference system being configured to use the schedule information to connect to a conference server to launch the virtual meeting on the room conference system, wherein the authenticating of the proximity-based connection between the user device and the room conference system comprises:

transmitting a meeting synchronization request to the room conference system;

receiving, in response to the meeting synchronization request, authentication data from the room conference system;

receiving, via the user device, a user input from the user;

determining that the authentication data received from the room conference system matches the user input received from the user; and authorizing, based on the determining that the authentication data matches the user input, the proximity-based connection between the user device and the room conference system.

14. The system of claim 13, wherein:

the server is within a private network associated with the organization;

the user device is outside of the private network and is authorized to access the server; and the room conference system is outside of the private network and is unauthorized to access the server.

15. The system of claim 13, wherein the establishing of the secured connection between the user device and the server comprises:

establishing a Virtual Private Network (VPN) connection between the user device and the server.

16. The system of claim 13, wherein the processor is further configured to execute the instructions to:

determine one or more configuration patterns associated with a time window based on a plurality of virtual meetings;

present, to the user, one or more meeting options corresponding to the one or more configuration patterns;

receive, from the user, a user selection of a meeting option among the one or more meeting options; and automatically apply, based on the user selection, the meeting option to one or more virtual meetings associated with the time window.

17. The system of claim 13, wherein the processor is further configured to execute the instructions to:

determine that the virtual meeting is launched on the room conference system;

determine that the user device and the room conference system are located insufficiently proximate to one another; and automatically terminate, based on the determining that the user device and the room conference system are located insufficiently proximate to one another, the virtual meeting on the room conference system.

18. A non-transitory computer-readable medium storing instructions that, when executed, direct a processor of a user device of a user to:

establish a secured connection between the user device and a server of an organization;

receive, from the server via the secured connection, schedule information of a virtual meeting associated with the user;

authenticate a proximity-based connection between the user device and a room conference system; and transmit, in response to the authenticating of the proximity-based connection, the schedule information of the virtual meeting to the room conference system via the proximity-based connection, the room conference system being configured to use the schedule information to connect to a conference server to launch the virtual meeting on the room conference system, wherein the authenticating of the proximity-based connection between the user device and the room conference system comprises:

transmitting a meeting synchronization request to the room conference system;

receiving, in response to the meeting synchronization request, authentication data from the room conference system;

receiving, via the user device, a user input from the user;

determining that the authentication data received from the room conference system matches the user input received from the user; and authorizing, based on the determining that the authentication data matches the user input, the proximity-based connection between the user device and the room conference system.

* * * * *